United States Patent [19]

Brandt et al.

[11] Patent Number: 5,875,327
[45] Date of Patent: Feb. 23, 1999

[54] HIERARCHY OF PREFERENCES AND PREFERENCE GROUPS

[75] Inventors: Marcia Lynn Brandt; Charles Embrey Carmack, Jr.; Joseph Vincent DiCecco, all of Rochester; Jason Robert Hansen, Chatfield; Thomas Michael Moskalik, Rochester; Timothy Jude O'Keefe, Rochester; Diane Elaine Olson, Rochester; Devon Daniel Snyder, Rochester, all of Minn.

[73] Assignee: International Business Machines Corporation, Armonk, N.Y.

[21] Appl. No.: 802,319

[22] Filed: Feb. 18, 1997

[51] Int. Cl.$^6$ .................................................. G06F 13/00
[52] U.S. Cl. ............................................................. 395/651
[58] Field of Search ...................... 364/DIG. 1 MS File, 364/DIG. 2 MS File; 395/200.3, 200.51, 200.52, 712, 651, 652, 653

[56] References Cited

U.S. PATENT DOCUMENTS

| | | | |
|---|---|---|---|
| 5,025,395 | 6/1991 | Nose et al. | 345/335 |
| 5,109,487 | 4/1992 | Ohgomori et al. | 345/341 |
| 5,129,056 | 7/1992 | Eagen et al. | 395/200.67 |
| 5,179,700 | 1/1993 | Aihara et al. | 345/326 |
| 5,255,358 | 10/1993 | Busboom et al. | 345/339 |
| 5,295,241 | 3/1994 | Eagen et al. | 345/332 |
| 5,345,553 | 9/1994 | Busboom et al. | 345/332 |
| 5,437,014 | 7/1995 | Busboom et al. | 345/329 |
| 5,530,961 | 6/1996 | Janay et al. | 345/334 |
| 5,561,811 | 10/1996 | Bier | 395/825 |

*Primary Examiner*—Robert B. Harrell
*Attorney, Agent, or Firm*—Schmeiser, Olsen & Watts

[57] ABSTRACT

The present invention provides a system and method of workstation configuration that includes a multi-level hierarchy management of preferences which are essentially managed and stored with a file server, rather than with each individual workstation. The invention comprises a computer network that includes workstations that have configurable hardware devices and software applications; a workstation server connected to the workstations that includes hierarchical preference files containing configuration information; and a preference manager for providing a coalesced, or merged, set of configuration parameters to the workstations based on the information in the hierarchical preference files.

44 Claims, 6 Drawing Sheets

HIERARCHY OF PREFERENCES AND PREFERENCE GROUPS

FIELD OF THE INVENTION

The present invention relates to computer network systems. More particularly, the present invention relates to the configuration of client workstations in a network.

BACKGROUND OF THE INVENTION

In today's highly computerized society, it is well established that computers must provide a comfortable environment for the end users. Such environments are typically created by providing user-friendly hardware devices (e.g., a mouse) and software systems (e.g., graphical user interfaces). The efficacy of these systems is often further enhanced by their ability to be configured to meet the specific preferences of a user. Thus, users can personalize such things as the background color on their computer screen, mouse click rates, options within a specific software application, start-up screens, etc. This ability to personalize, or set preferences, allows computer systems to be tailored to meet the specific needs of the end-user to thereby provide a consistent and comfortable environment.

Concurrent with the goal of providing a user-friendly environment in order to advance computers in today's society is the proliferation of computer networks. Computer networks, such as the Internet, the World Wide Web, intranets, local area networks (LANS), etc., allow remote computers to exploit the resources of other, often more powerful, computer systems. The combination of a user-friendly environment with a computer network is therefore seen to be of particular importance as new computer systems are developed. For example, new systems such as IBM's Network Stations, seek to provide inexpensive, yet powerful, computer workstations by exploiting the power of a computer network while maintaining an advanced work environment.

Of particular importance in this invention is the recognition of the need to provide networked workstations which can not only be configured to the specific hardware characteristics of a terminal, but also to the preferences of a particular user, group of users, system administrator, owner, or manufacturer. Prior art solutions for configuring workstations in a network are unfortunately limited in various respects, including the fact that workstation preferences do not change based upon the end user, but rather exist for each individual workstation. Thus, under the prior art, individual preferences are unable to follow the user to any workstation in the network. Moreover, there is no way to save and meaningfully use appropriate sets of preferences for the individual currently using the workstation. That is, there is no known way to make the administration of preferences a manageable task. For example, there is no known way to provide for ad hoc groups of user preferences for local administrator defined levels of support.

While it is known to use preference files for configuring workstations in applications in a network, prior solutions only allow preference files to be managed at two levels, at the installation level (where default parameters are incorporated for each workstation) and at the user level (where the user alters the default parameters for a specific workstation). Thus, under the prior art only two "entities" or factors influence the final configuration of each workstation. This invention recognizes this as a serious limitation because there are many additional factors that should influence how a workstation is configured. For example, user groups, system administrator preferences, specific terminal hardware, time/date of logon, etc. are all factors that could potentially be used to influence the configuration of a particular workstation. The prior art fails to provide a comprehensive solution for utilizing preference files to incorporate such factors into workstation configuration.

In summary, the prior art does not allow the preferences of a user to follow him or her around to any workstation in a network, nor does it provide a comprehensive means for incorporating additional factors into each workstation configuration. Thus, without a more comprehensive approach to configuring workstations in a network, the overall flexibility of the network will be limited. All of the aforementioned art and technology references are herein incorporated by reference.

SUMMARY OF THE INVENTION

The present invention provides a system and method of workstation configuration that includes a multi-level hierarchy management of preferences which are essentially managed and stored with a file server, rather than with each individual workstation. In a first aspect, the invention comprises a computer network that includes workstations that have configurable hardware devices and software applications; a workstation server connected to the workstations that includes hierarchical preference files containing configuration information; and a preference manager for providing a coalesced, or merged, set of configuration parameters to the workstations based on the information in the hierarchical preference files.

The preference manager comprises a selection mechanism for 1) selecting relevant preference files from each of a plurality of hierarchy levels stored on a file server, and 2) causing configuration information from the selected preference files to be downloaded to a client. It further includes a coalescing mechanism for applying the downloaded configuration information to a specific workstation.

It is recognized that the actual location of the preference manager within the network is not critical and that certain aspects of the preference manager may reside on the file server (i.e., a server preference manager), while other aspects may reside on the client (i.e., a client preference manager). For example, both the client and server preference managers will typically share responsibility for such tasks as selecting preference files stored on the server. Nonetheless, because the preference files are stored and managed on the file server, the bulk of the selection process will likely be performed by the server preference manager. (Under certain circumstances, however, the client preference manager may know which preference file it needs and may directly request the file to be downloaded.) Alternatively, the client preference manager will likely perform the bulk of the coalescing operation, since most of the coalescing function needs to be performed on the client where new configuration information is being merged with existing configuration information.

A second aspect of the present invention provides a method for managing multi-level preferences for a client computer and a network that includes the steps of selecting relevant preference files from a plurality of hierarchal preference files, reading a plurality of information from the relevant preference files, downloading and merging the plurality of information and applying the results (i.e., configuration parameters) to a client computer. The step of merging information further includes the steps of identifying conflicting parameters that might exist in the relevant preference files, identifying the hierarchy level of each of the relevant preference files containing conflicting parameters, and resolving conflicting parameters based upon the hierarchy level of the relevant preference files containing the conflicting parameters.

Therefore, it is an advantage of the present invention to provide a multi-level hierarchy of preferences for workstation configuration.

Therefore, it is an additional advantage of the present invention to provide central management and storage of network workstation configurations, rather than locally at the client level.

It is a further advantage of the present invention that a user be able to automatically enact his or her preferences any time the user signs on to any workstation in the network.

It is a further advantage of the present invention to provide a system that allows for both software and hardware configuration.

DETAILED DESCRIPTION OF THE PREFERRED EMBODIMENT

Overview

This description describes a network capable of providing a novel system and method of performing workstation configuration. The network is comprised of a plurality of configurable workstations, and at least one file server. Workstations are configured by applying configuration parameters to the operating system (or other interface system) running on each workstation. Parameters may be received from a file on the client, from a remote transmission source (e.g., a connected file server or other computer), from the keyboard, or any other known input system. While in the below described preferred embodiment, parameters are received and applied in a sequential manner from a remote file server, this invention should not be interpreted to be limited to such implementations.

Each configurable workstation (hereinafter "client") includes a mechanism for sending "identifiers" to the file server; a mechanism for receiving streams of configuration information; a mechanism for applying the configuration to the client; and a mechanism for resolving conflicts with previously applied configuration information.

The file server includes a mechanism for managing and accessing a plurality of preference files containing configuration information; a mechanism for receiving "identifiers" from clients, a mechanism for selecting preference files based upon the received "identifiers"; and a mechanism for downloading selected preference files to the client. While in the below described preferred embodiment the plurality of preference file are organized in a hierarchical fashion, this invention should not be limited to such embodiments. Thus, any method of managing, storing and accessing configuration information on a centralized or distributed host is contemplated as part of this invention.

An example of this implementation is as follows. During the initialization of a client workstation, an initial set of preferences are downloaded and processed, with the resultant configuration of the terminal being the combination of the manufacturer's and the administrator's defined preferences. Then, when a user signs on to the workstation, his additional preferences are downloaded and processed, with the resultant configuration being the combination of all of the downloaded preferences. The result is a workstation that is configured for the needs of the manufacturer, the owner/administrator, a group of users, and the end user.

As noted, the system includes a mechanism for resolving conflicting parameters. Resolving conflicts may be done in any manner such as one that utilizes a "last one applied wins" scenario. In such a case, an end user's preference will overrides a group, administrator, or manufacturer preference, since a user preference will likely be the last one to be downloaded and applied to the workstation. However, the system is contemplated to be flexible enough to allow for certain preferences that can not be modified by later applied configuration data. For example, in configuring the hardware, the manufacturer defines a preference to indicate that station configuration passwords are required but they are not currently enabled. The administrator, in his preference file, enables the station configuration passwords, and sets it to a specific value. The end user of the workstation would, and should have no option with respect to using a password since this is an administrator level of function.

Applications for this invention include a situation where the administrator might pick a blue background for the desk top as a general system preference. A group of users comprised of installation security offers could be required to have a red background—and so a group is defined and a preference of a red background is defined for the group. When any member of the group signs on, the group preferences are applied to the station, and a red background is obtained. Going a step further, an individual user, and member of this group of security officers, may want a pink background because of some eye problems. These individual preferences are also applied as he signs on, and the background for his display is then pink.

Unique to this solution and implementation is also the notion of a central/host storage of not only application preferences, but also hardware preferences. Hardware configuration values such as mouse button configuration, mouse pointer speeds, keyboard auto repeat rates, keyboard repeat delay, keyboard mapping language, audio volume setting, background color, screen saving/power monitor settings are saved/stored on a host and downloaded to configure the terminal as a user signs on. Also, an administrator as well as the individual user may define preferences for the user. The administrator may define/set/change preferences for all users, or for an individual user, or for a group of users.

In the preferred embodiment, the multi-level hierarchy of preference files are shown to include manufacturer preference files, installation preference files, terminal specific preference files, group preference files and user preference files. Nonetheless, it is recognized that the actual number of hierarchical levels for preference files may be arbitrarily chosen to be a much higher number.

DETAILED DESCRIPTION

Figure 1:
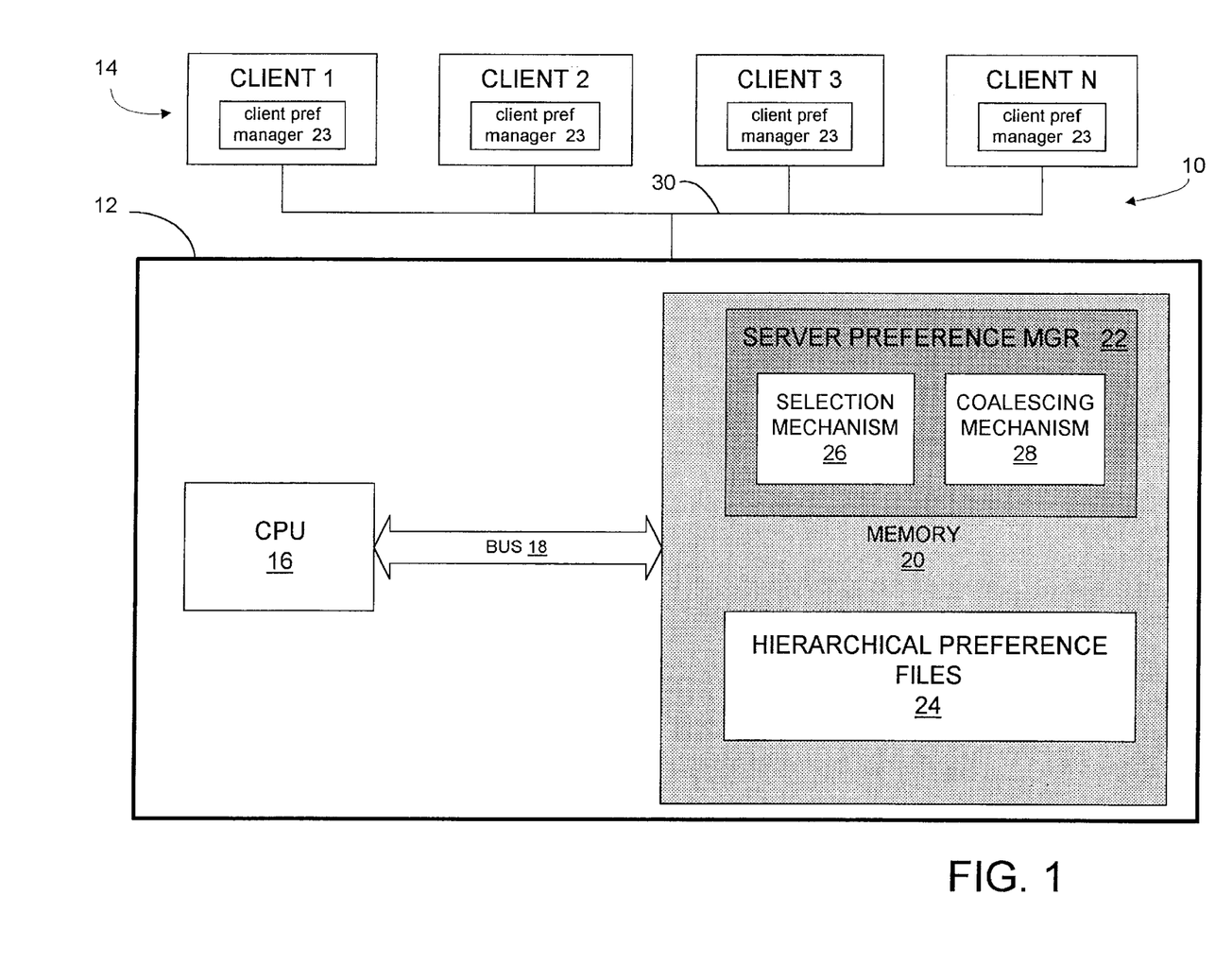
FIG. 1 depicts a block diagram of a network system in accordance with a preferred embodiment of the present invention.

Referring now to FIG. 1, a network system 10 is shown comprising a server system 12 and a plurality of clients 14. The server system 12 may be any known type of file server including an AS/400, an IBM PC, an RS 6000, a System 390, etc., and clients 14 may be any known type of programmable client workstations including UNIX™ workstations, IBM PC's, IBM's Network Stations, etc. File server 12 includes a central processing unit 16, a bus 18, and a memory 20. Stored in memory 20 is a server preference manager 22 and a plurality of hierarchal preference files 24. Server preference manager 22 may be executed on CPU 16 via bus 18. Server preference manager 22 is shown including a selection mechanism 26 and a coalescing mechanism 28. It is understood that memory 20 represents any known type of memory system including disc drives, tape drives, RAM, ROM, optical discs, etc. It is also understood that while server preference manager 22 and the hierarchal preference files 24 are shown to exist on file server 12, it is possible that the server preference manager 22 and preference files 24 could exist at some other type of centralized location as long as it is accessible by the clients in the network.

In addition to the server preference manager 22, each client includes a client preference manager 23 stored and executable on the client. Each client preference manager may also include both a selection and a coalescing mechanism. The client-based functions controlled by the client preference manager 23, which will typically be implemented in software, are described in more detail below. Like the file server 12, each client workstation 14 will typically be programmable and include basic components such as a memory, central processing unit (CPU), bus, etc.

Clients 14 are in communication with file server 12 via communication link 30. Communication link 30 may be any known type of communication link including Ethernet, token ring, twisted pair, a wireless device, etc. Each of said clients 14 include configurable hardware and software application systems. Examples include screen colors, mouse configurations, web browser parameters, etc. As noted, different users typically have different preferences for workstation configurations. Pursuant to this embodiment, each user is able to have his or her preferences configured regardless of which client workstation they use. In addition, each workstation may have unique terminal specific configurations (e.g., keyboard type, monitor configuration, etc.), which are also taken into account.

Accordingly, a user has his or her workstation configured as follows. When a workstation is turned on, and when a user subsequently logs on, the client and server preference managers 23 and 22 cooperate to select appropriate preference files from the hierarchical preference files 24. The bulk of the selection process will typically occur on the server, where the server preference manager 22 decides which of a plurality of preference files to download to the client. The client preference manager 23 will typically facilitate the selection process by providing information to the server preference manager (e.g., workstation address, user ID, etc.). Furthermore, it is conceivable that under certain circumstances, the client preference manager would exclusively decide to download a preference file. As each selected file has its configuration information downloaded to the client workstation 14, the client preference manager 23 applies the configuration information from each selected preference file in a successive manner such that each subsequent set of information is coalesced or merged with any prior sets of information. Thus, it is envisioned that the client preference manager 23 on each client will typically perform the bulk of the coalescing function. However, it is recognized that under certain circumstances, particularly in the case where multiple files are to be downloaded at once, performance can be enhanced by having a coalescing mechanism 28 on the server coalesce or "pre-process" preference files prior to download. Once the client preference manager 23 applies the configuration information, the result is a uniquely configured workstation that includes many levels of coalesced configuration information. Thus, the configuration of a given client is both user and workstation dependent. The method and system of choosing the hierarchal preference files and coalescing them is described in further detail with regard to FIGS. 2 and 3.

Figure 2:
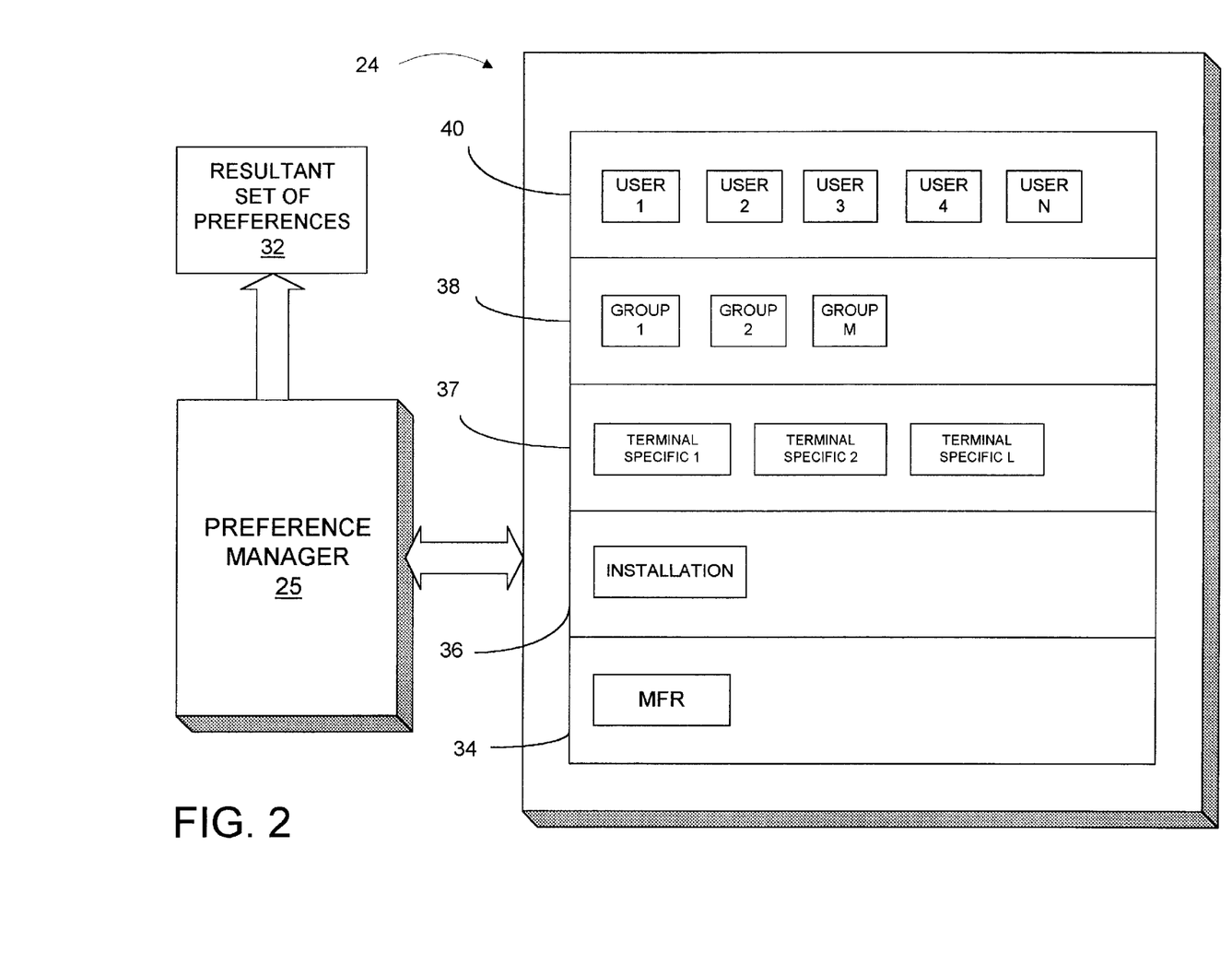
FIG. 2 depicts a block diagram of a preference manager, a plurality of hierarchal preference files and a resultant preference file in accordance with a preferred embodiment of the present invention.

FIG. 2 depicts a preference manager 25 (which encompasses both the server preference manager 22 and client preference manager 23 of FIG. 1), a plurality of hierarchal preference files 24, and a resultant coalesced set of preferences 32. Under this preferred embodiment, the resultant set of preferences 32 will be implemented, and therefore reside, on the client. However, it is recognized that the resultant preferences 32 could reside on the server and be download to the client at a later time.

The preference manager 25 may exist as a single or group of program products that reside on a recordable media such as a magnetic disk or tape, optical disk, or wireless transmission media. Each program product will typically include executable machine code capable of running on either or both of the client workstations 14 or centralized server 12.

As noted above, upon certain events, such as when a terminal is turned on or when a user logs onto a workstation, the preference manager 25 operates to provide a resultant set of preferences 32 for the workstation. FIG. 2 depicts one possible hierarchy of preference files 24. Here it can be seen that there are five levels within this hierarchy. The first or bottom level is a manufacturer's preference file that contains all of the default workstation configuration parameters as decided by the manufacturer. The next level contains the installation preference file 36 which includes all of the preferences set up by the owner or system administrator (e.g., password settings), typically when the network is initially installed. It is conceivable that the installation preference file 36 and the manufacturer's preference file 38 may be merged or coalesced ahead of time to provide a single administrator/manufacturer merged file for later use. The next level of preferences include terminal specific information files 37 (e.g., a hardware address of the client, type of keyboard, etc.). The next hierarchal preference level contains a plurality of group preference files 38. The group preference files 38 may be set up to provide default preferences for various groups of users. For example, users that are working on a particular project or work within a division may have a specific background color on their workstation. The top level of preference files 40 are the user preference files. Each user having access to the network may have a user preference file that further sets up configuration preferences specific to the individual user. For example, a left handed user may request that the mouse be configured for a left-handed click rather than a right-handed click.

As noted above, conflicting configuration parameters may be downloaded to the client and such conflicts will be resolved by the preference manager. For those preferences which can be altered, the configuration parameters in the user preference files will typically take precedence over the parameters in the group preference files, which will take precedence over the configuration parameters in the install preference file, which will take precedence over the configuration parameters in the manufacturer's preference file.

Figure 4:
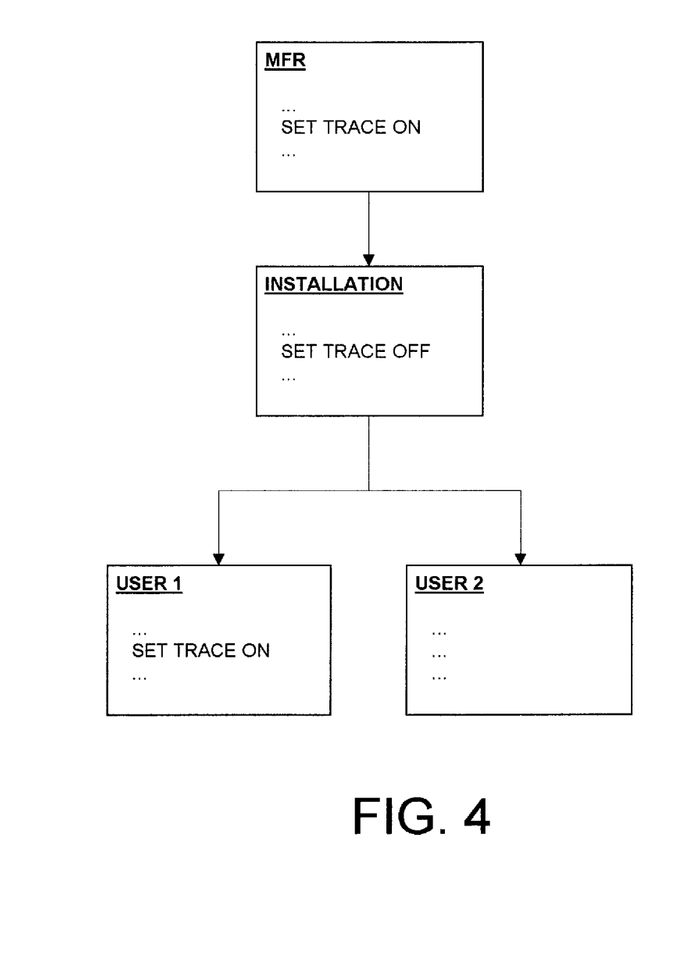
FIG. 4 depicts an example of coalescing preference files in accordance with a preferred embodiment of the present invention.
Figure 5:
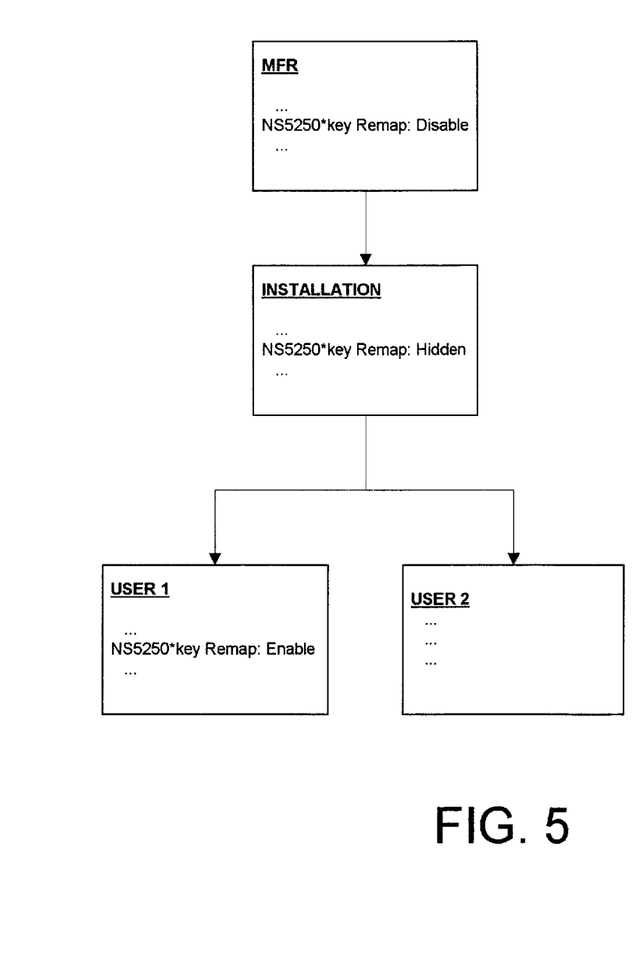
FIG. 5 depicts an example of coalescing preference files in accordance with a preferred embodiment of the present invention that includes blocking.
Figure 6:
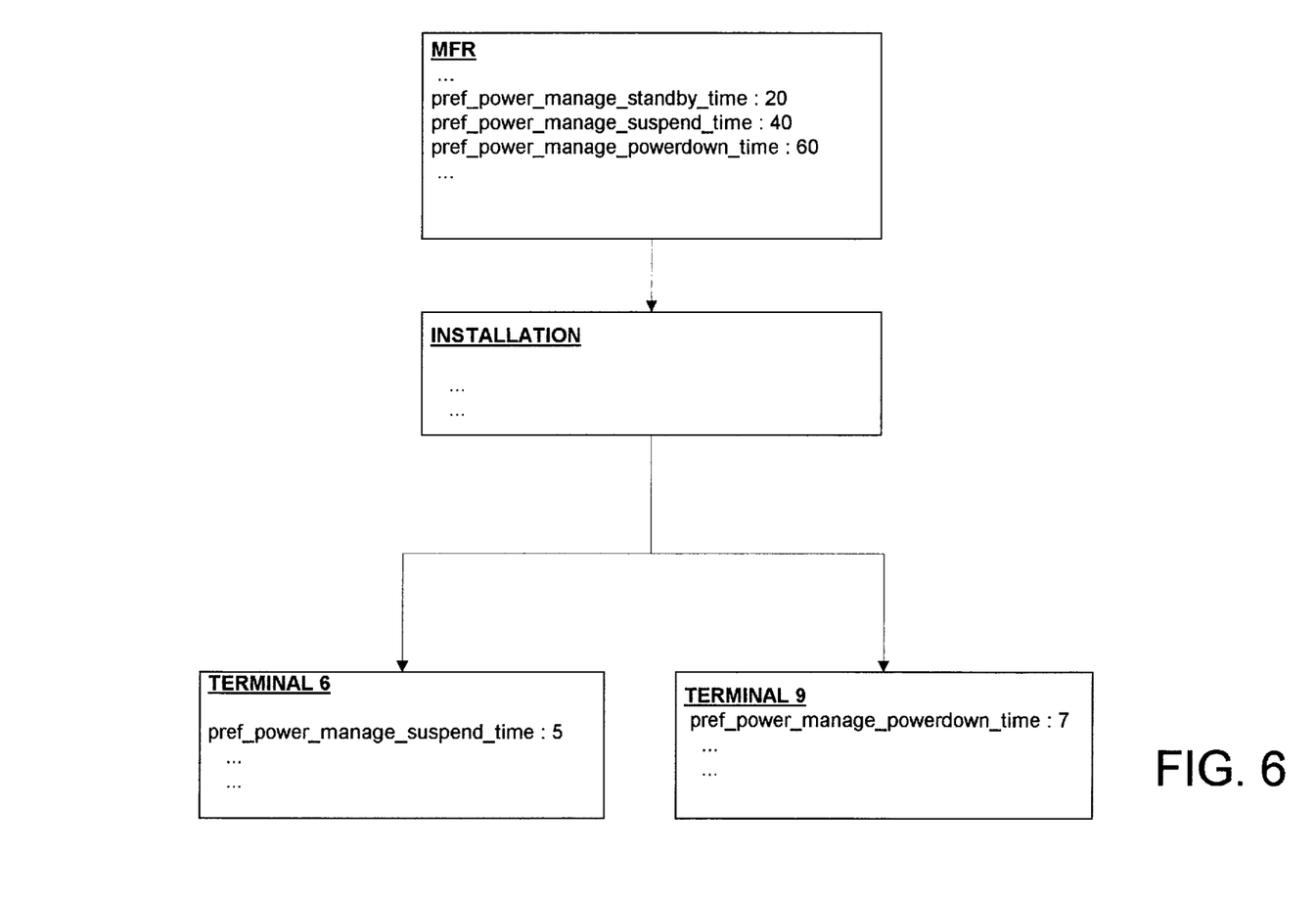
FIG. 6 depicts an example of coalescing preference files in accordance with a preferred embodiment of the present invention that includes terminal specific parameters.

Further examples of the coalescing process of this invention are shown in FIGS. 4–6. Each of these figures depict examples of how certain configuration parameters from manufacturer, installation, terminal specific and user preference files may be sequentially coalesced. In the first example, FIG. 4, conflicts are resolved in a straightforward manner in which the most recently received parameters takes precedence over parameters received from prior preference files. In this case, the manufacturer preference file (which is applied first) includes a command to "SET TRACE ON." That parameter is then overridden by the installation preference file (which is applied second) that directs the workstation to "SET TRACE OFF." Then, if a first user were to log on, their user preference file (USER 1) would be applied. In this case it would include the command to "SET TRACE ON." Alternatively, a second user preference file (USER 2) is shown which does not include any command for the SET TRACE function. The resultant workstation for USER 1 would then be configured with TRACE turned on, while the resultant workstation for USER 2 would be configured with TRACE turned off. This is an example of the "last applied wins" scenario.

FIG. 5 depicts a second scenario involving a "key remapping" function. In this case the manufacturer preference file initially provides a command to disable the key remap. The installation preference file then causes the remap function to become "Hidden." The effect of this is that end user preference files are unable to select the remap function. Thus, USER 1's attempt to enable the key Remap would be invalid. The resultant therefore, for both USER 1 and USER 2 would be to have "key Remap" disabled. This example provides one possible method of "blocking" subsequent configuration information thereby circumventing the "last applied wins" implementation of FIG. 4.

FIG. 6 depicts a third coalescing scenario involving hardware preferences. In this case, the manufacturer preference file has provided default settings for terminal behavior. In particular, each workstation is set to enter standby mode after 20 minutes of inactivity, enter suspend mode after 40 minutes of inactivity, and powerdown mode after 60 minutes of inactivity. Although the installation preference file does not include any commands to override this behavior, the depicted terminal specific preference files (TERMINAL 6 and 9) do include commands to modify the configuration. TERMINAL 6 changes the suspend time to 5 minutes, while TERMINAL 9 changes the powerdown time to 7 minutes. This examples depicts how terminal specific hardware features can be controlled independently of end users (and other) preferences. Thus, in this case, a user could jump from TERMINAL 6 to 9 without affecting the terminal specific settings for each terminal.

It should be recognized that the examples shown in FIGS. 4–6 provide only limited examples of how coalescing may be implemented. It is envisioned that actual implementation will depend upon the design criteria for each specific network.

As noted in FIG. 1, the preference manager also includes a selection mechanism for selecting preference files from the hierarchal arrangement of files as shown in FIG. 2. A typical selection scenario will be as follows. When a terminal is turned on or when a user logs on, the preference manager will selectively examine and select from the preference files stored on the file server 12 (i.e., it will choose from the manufacturer's preference file, the installation preference file, terminal specific preference files, any relevant group preference files and the relevant user preference files). Criteria used to select appropriate preference files may include a user id or password, the physical address of the client, terminal configuration values associated with the client, etc.

Figure 7:
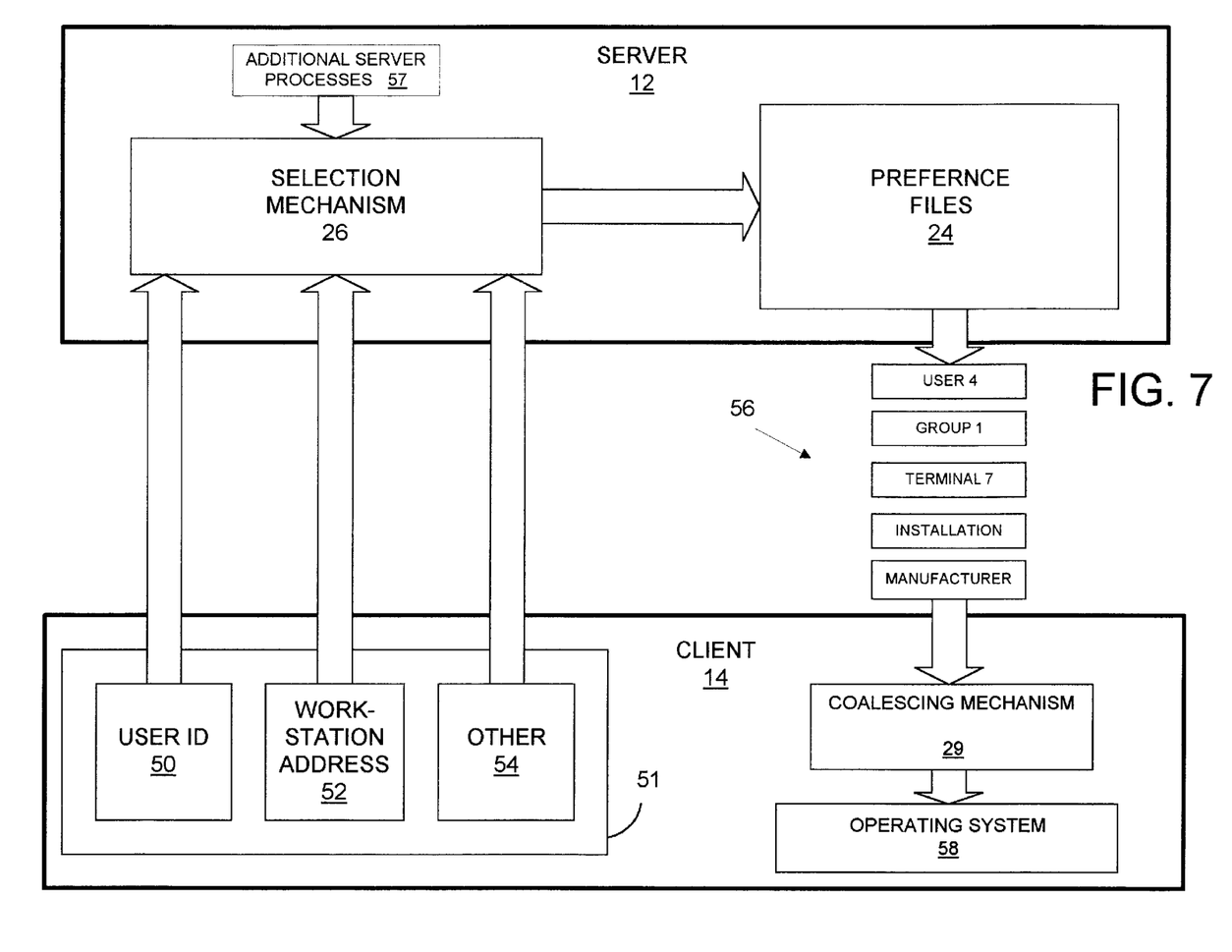
FIG. 7 depicts a block diagram of a preference manager operation in accordance with a preferred embodiment of the present invention.

FIG. 7 depicts an overview of the selection mechanism operation. The selection mechanism will generally select preference files 24 based upon inputted "identifiers" 51 that include a USER ID 50 (or other unique user identifier such as a password), the physical address of the workstation 52 (or some other unique terminal identifier), and other miscellaneous information 54. Other miscellaneous information 54 may include time of day, date, the actual physical location of the workstation (e.g., first floor of building n), etc. Based upon such input, the selection mechanism 26 will select appropriate preference files 56. The selection mechanism may interact as necessary with additional processes 57 running on the file server 12 to gather further information needed to select appropriate preference files (e.g., whether or not the identified user is part of a "group" of users, etc.).

Once the relevant preference files 56 are selected, the preference manager causes the files to be sequentially downloaded to the client 14. Once received on the client, the selected preference files 56 are applied and coalesced by the coalescing mechanism 29 to the operating system 58.

As noted above, it is recognized that the functionality of both the selection and coalescing processes may be divided as necessary between the server and client. For example, while portions of the preference manager are shown to reside on both a centralized file server and the clients, it is recognized that the system could be configured such the file server handle the entire selection and coalescing processes. In such a case, the file server would return a single coalesced preference file to the client rather than streams of information. In this preferred embodiment however, the relevant preference files are downloaded to the workstation where they are remotely or locally coalesced and processed.

Figure 3:
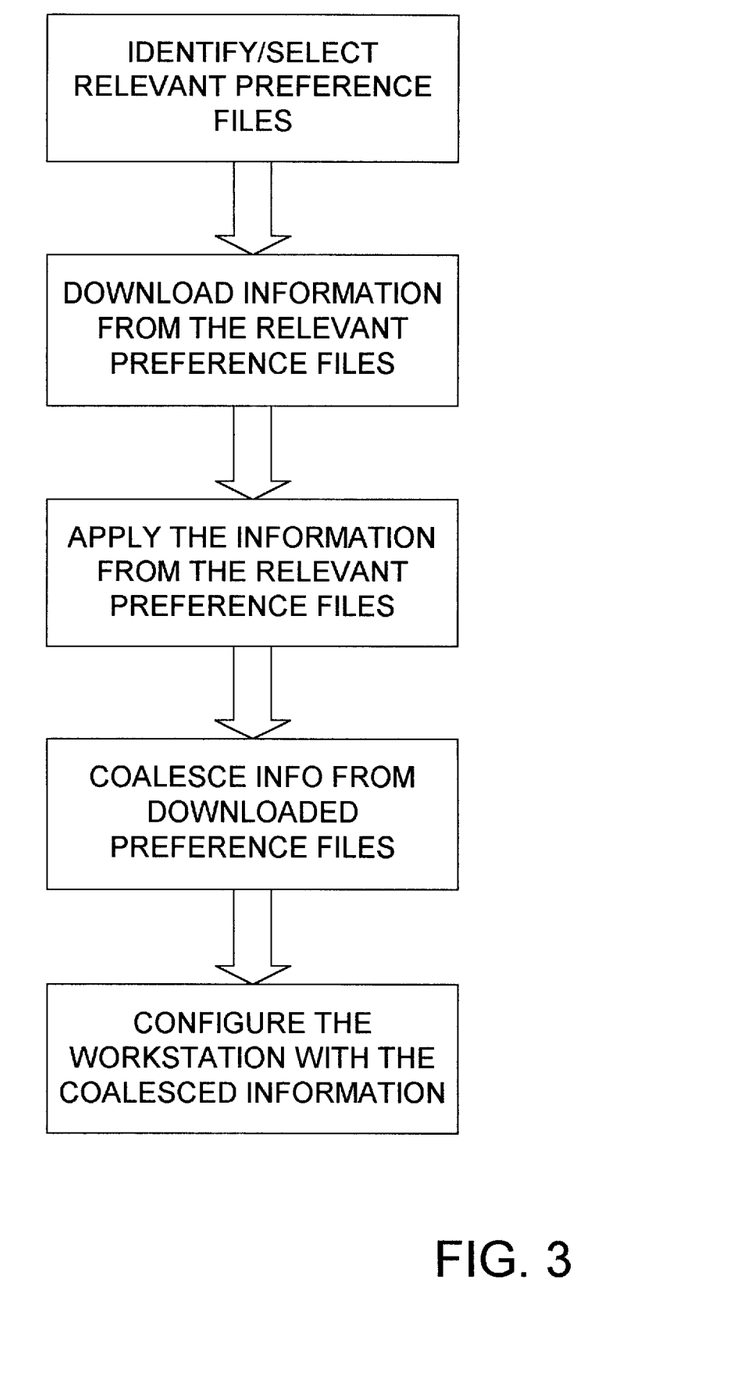
FIG. 3 depicts a flow chart of a preferred method of the present invention.

Referring now to FIG. 3, a flow diagram is shown depicting the basic steps involved in a preferred method of this invention. First, relevant preference files are identified. This identification process was discussed above with respect to FIG. 2 and may include information such as who the user is, what group or "group of groups" the user is in, whether or not the system's administrator was involved in configuring default parameters for the network workstations, what unique characteristics the workstation includes, etc. As noted, this selection process is primarily done by the selection mechanism 26 on the server 12 (see FIG. 1). However, as discussed above, it is likewise envisioned that the client process manager 23 could play a significant role in the selection process.

As relevant preference files are selected, the information contained therein is successively downloaded to the client workstations 14 (FIG. 1). The step of downloading configuration files may occur in a short span of time or may occur incrementally over a long period of time. For example, when the workstation 14 is first turned on, certain default parameters may be downloaded (e.g., the background color of the screen). Later, some other entity, such as a systems administrator or software system, may decide to download additional preferences for the workstation (e.g., a sign-on screen). Finally, user and group user preferences will be downloaded when a user signs on or starts an application.

The workstation 14 then applies the configuration information as it is received from the server 12. Each subsequent set of configuration information is then merged or coalesced with any prior information on the client workstation 14 by the client preference manager 23. Again, the merging or coalescing of preference files will typically utilize some hierarchal scheme of precedence where information from preference files located in higher levels of the hierarchy take precedence over information from preference files located in lower levels of the hierarchy (see FIG. 2). However, it is recognized that under different circumstances, configuration parameters from lower level preference files may take precedence over configuration parameters from higher level preference files. For instance, a systems administrator may decide that there are certain parameters or configuration options that cannot be overridden by general users (e.g., password and account information). Determining priority rules for different configuration parameters is completely within the purview of the person implementing this invention and such rules may be incorporated in either or both of the client 23 and server 22 preference managers. Ultimately, the result for the user is an automatically configured client workstation 14 configured with a unique set of configuration parameters or preferences 32 (see FIG. 2).

Finally, it should be recognized that while this preferred embodiment considers the case of a relatively small number of hierarchy preference levels (e.g., FIG. 2 shows five levels), it is envisioned that this invention may likewise be implemented with a large number of hierarchy levels (e.g., hundreds). Thus, it is recognized that the height (i.e., the number of levels) and width (i.e., the number of preference files in each level) may be arbitrarily chosen as large, or as small, as desired for a particular application.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

We claim:

1. A computer network comprising:
    a plurality of workstations, wherein each of said workstations include uniquely configurable hardware devices and software applications;
    a workstation server, wherein said workstation server is operationally connected to said plurality of workstations, and includes a plurality of preference files stored in memory wherein each preference file includes configuration information; and
    a preference manager that provides a coalesced set of configuration parameters to any one of said workstations wherein said preference manager includes a first set of functional components that reside on each of said plurality of workstations and a second set of functional components that reside on said workstation server, said preference manager including a system that selects from said plurality of preference files and a system that coalesces said selected preference files.

2. The computer network of claim 1 wherein said system that selects from said plurality of preference files includes a mechanism that receives at least one identifier as input criteria for selecting preference files.

3. The computer network of claim 2 wherein said at least one identifier is a user id.

4. The computer network of claim 2 wherein said at least one identifier is a workstation identifier.

5. The computer network of claim 2 wherein said at least one identifier includes time and date information.

6. The computer network of claim 2 wherein said at least one identifier includes information containing a physical location of said workstation.

7. The computer network of claim 1 wherein each of said preference files are assigned to one of a plurality of hierarchy levels.

8. The computer network of claim 7 wherein said system for coalescing said relevant hierarchical preference files resolves conflicting configuration information between preference files based upon the hierarchical level of the preference files.

9. The computer network of claim 1 wherein said preference files include manufacturer preference files, installation preference files, terminal specific preference files, group preference files and user preference files.

10. The computer network of claim 1 wherein each of said workstations include an interface system that causes the workstation to be configured in a predetermined manner when the workstation receives said coalesced set of configuration parameters.

11. The computer network of claim 1 wherein said system that coalesces said selected hierarchical preference files includes a mechanism that handles a pair of conflicting parameters by applying the most recently received parameter and canceling the earlier received parameter.

12. The computer network of claim 1 wherein said system that coalesces said selected hierarchical preference files includes a mechanism that blocks sequentially applied configuration parameters.

13. A program product that sets configuration preferences on a networked workstation, said program product comprising:
    a recordable media; and
    a preference manager recorded on said recordable media, said preference manager including:
    a selection mechanism that selects from a plurality of preference files stored on a network file server and downloads said selected preference files to said networked workstation, said selection mechanism being executable on said network file server; and
    a coalescing mechanism that receives a plurality of configuration parameters from each of said selected preference files and that applies said configuration parameters to said networked workstation, said coalescing mechanism being executable on said networked workstation.

14. The program product of claim 13 wherein said plurality of preference files are stored in a plurality of hierarchy levels.

15. The program product of claim 14 wherein said plurality of hierarchy levels include a manufacturer level.

16. The program product of claim 14 wherein said plurality of hierarchy levels include an installation level.

17. The program product of claim 14 wherein said plurality of hierarchy levels include a group user level.

18. The program product of claim 14 wherein said plurality of hierarchy levels include a user level.

19. The program product of claim 14 wherein said plurality of hierarchy levels include a terminal specific level.

20. The program product computer network of claim 13 wherein said selection mechanism includes a mechanism that receives at least one identifier as input criteria for selecting preference files.

21. The program product of claim 20 wherein said at least one identifier is a user id.

22. The program product of claim 21 wherein said at least one identifier is a workstation identifier.

23. The program product of claim 21 wherein said at least one identifier includes time and date information.

24. The program product of claim 21 wherein said at least one identifier includes information containing a physical location of said workstation.

25. The program product of claim 20 wherein said coalescing mechanism includes a mechanism that resolves a pair of conflicting parameters by applying the most recently received parameter and canceling the earlier received parameter.

26. The program product computer network of claim 20 wherein said coalescing mechanism includes a mechanism that blocks sequentially applied configuration parameters.

27. The program product of claim 13 wherein configuration preferences include hardware preferences.

28. The program product of claim 13 wherein configuration preferences include software application preferences.

29. The program product computer network of claim 13 wherein each of said networked workstations includes an interface system that causes the workstation to be configured in a predetermined manner when the received configuration parameters are applied.

30. A method for managing preferences for a client computer in a network, comprising:
    selecting a preference file from a plurality of preference files stored on a file server, wherein said plurality of preference files contain configuration parameters for client computers in the network;
    sequentially downloading from said file server said configuration parameters stored in said selected preference files to said client computer; and
    applying said configuration parameters to said client workstation; and
    merging said configuration parameters with any previously applied configuration parameters.

31. The method of claim 30 wherein said step of merging the configuration parameters includes performing on the client computer the steps of:
    identifying conflicting configuration parameters; and
    resolving identified conflicting parameters by applying the most recently received conflicting parameter and removing the previously received conflicting parameter.

32. The method of claim 31 further including the step of selectively blocking subsequently received conflicting parameters.

33. The method of claim 30 wherein said plurality of preference files include at least one file identifiable as a file for storing manufacturer preferences, at least one file identifiable as a file for storing installation preferences, at least one file identifiable as a file for storing individual terminal characteristic parameters, at least one file identifiable as a file for storing group preferences, and at least one file identifiable as a file for storing user preferences.

34. The method of claim 30 wherein said plurality of preference files are categorized into a plurality of hierarchy levels.

35. The method of claim 30 wherein said plurality of preference files are stored on a centralized host accessible to a plurality of client computers.

36. The method of claim 30 wherein the step of selecting said preference file includes the step of sending identifiers to said file server from said client.

37. A method of setting user preferences on a client workstation during a log-on procedure, comprising the steps of:
    downloading configuration information from a first file stored at a central location containing manufacturer preference parameters;
    downloading configuration information from a second file stored at said central location containing installation preference parameters;
    downloading configuration information from a third file stored at said central location containing terminal specific configuration parameters;
    downloading configuration information from a fourth file stored at said central location containing user preference parameters; and
    merging and applying said configuration information from said first, second, third and fourth file to said client workstation.

38. The method of setting user preferences of claim 37 wherein said step of merging said configuration file information includes the steps of:
    identifying conflicting parameters that exist in said first, second, third and fourth files;
    identifying a hierarchy level for each file; and
    resolving conflicting parameters based upon the hierarchy levels of the relevant files.

39. The method of claim 38 further comprising the step of reading information from a fifth file stored at said central location containing group user configuration parameters.

40. A network system comprising:
    a file server having a first bus, a first central processing unit, a first computer system memory connected to said first central processing unit via said first bus, and a server preference manager stored in said first computer system memory and executable by said first central processing unit, said server preference manager including a selection mechanism that selects from a plurality of hierarchical preference files stored in said first computer system memory wherein said selection mechanism selects up to one preference file from each of a plurality of hierarchy levels; and
    a client, said client being networked to said file server and having a second bus, a second central processing unit, a second computer system memory connected to said second central processing unit via said second bus, and a client preference manager stored in said second computer system memory and executable by said second central processing unit, said client preference manager including a coalescing mechanism that receives, coalesces and applies configuration parameters from said selected hierarchical preference files to said client.

41. The network system of claim 40 wherein said server preference manager further includes a server coalescing mechanism.

42. The network system of claim 40 wherein said client preference manager further includes a client selection mechanism.

43. A network station manager for managing and storing programs and data for a plurality of network stations, said network station manager comprising:

a bus;

a central processing unit;

a computer system memory, said computer system memory being connected to said central processing unit via said bus; and a preference manager, said preference manager stored in said computer system memory and executable by said central processing unit, said preference manager including:

a selection mechanism that selects from a plurality of hierarchical preference files stored in said computer system memory and that downloads configuration information from said selected preference files to said network stations, wherein said selection mechanism selects up to one preference file from each of a plurality of hierarchy levels; and a coalescing mechanism that is downloadable to, and executable on, said network stations wherein said coalescing mechanism coalesces and applies downloaded configuration parameters to said network stations.

44. The network station of claim 43 wherein said configuration parameters include hardware configuration parameters.

* * * * *